United States Patent
Ying et al.

(10) Patent No.: US 9,093,923 B2
(45) Date of Patent: Jul. 28, 2015

(54) THREE-LEVEL CONVERTER HAVING PHASE BRIDGE ARM

(71) Applicant: DELTA ELECTRONICS, INC, Taoyuan Hsien (TW)

(72) Inventors: Jian-Ping Ying, Taoyuan Hsien (TW); Shao-Cai Ma, Taoyuan Hsien (TW); Hong-Jian Gan, Taoyuan Hsien (TW); Sen-Lin Wen, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 70 days.

(21) Appl. No.: 13/930,854

(22) Filed: Jun. 28, 2013

(65) Prior Publication Data

US 2014/0254228 A1    Sep. 11, 2014

(30) Foreign Application Priority Data

Mar. 8, 2013   (CN) .......................... 2013 1 0074909

(51) Int. Cl.
*H02M 7/5387* (2007.01)
*H02M 1/00* (2006.01)
*H02M 7/487* (2007.01)
*H02M 7/00* (2006.01)

(52) U.S. Cl.
CPC ............ *H02M 7/5387* (2013.01); *H02M 7/487* (2013.01); *H02M 7/003* (2013.01)

(58) Field of Classification Search
CPC .... H02M 7/003; H02M 7/5387; H02M 7/487
USPC ........... 363/50, 55–57, 95–98, 126–132, 140, 363/144
See application file for complete search history.

(56) References Cited

U.S. PATENT DOCUMENTS

| | | | | |
|---|---|---|---|---|
| 5,132,896 A | * | 7/1992 | Nishizawa et al. | 363/144 |
| 5,414,616 A | * | 5/1995 | Hatozaki | 363/132 |
| 5,517,401 A | * | 5/1996 | Kinoshita et al. | 363/98 |
| 5,623,399 A | * | 4/1997 | Ishii et al. | 363/132 |
| 5,625,545 A | | 4/1997 | Hammond | |
| 5,910,892 A | * | 6/1999 | Lyons et al. | 363/98 |
| 6,028,779 A | * | 2/2000 | Sakamoto et al. | 363/55 |
| 6,058,031 A | * | 5/2000 | Lyons et al. | 363/67 |
| 6,249,448 B1 | * | 6/2001 | Regnier et al. | 363/144 |
| 6,456,516 B1 | * | 9/2002 | Bruckmann et al. | 363/144 |
| 6,697,274 B2 | * | 2/2004 | Bernet et al. | 363/132 |
| 6,838,925 B1 | * | 1/2005 | Nielsen | 327/391 |
| 6,867,560 B2 | * | 3/2005 | Arimitsu | 318/144 |
| 7,269,037 B2 | * | 9/2007 | Marquardt | 363/71 |

(Continued)

*Primary Examiner* — Timothy J Dole
*Assistant Examiner* — Yusef Ahmed
(74) *Attorney, Agent, or Firm* — Locke Lord LLP; Tim Tingkang Xia, Esq.

(57) ABSTRACT

A three-level converter includes at least one phase bridge arm, each including an upper-half and a lower-half bridge arm circuit modules. The upper-half bridge arm circuit module includes a first and a second switch units that are in series connection, and a first diode unit. The lower-half bridge arm circuit module includes a third and a fourth switch units that are in series connection, and a second diode unit. The first and second diode units are connected to the neutral point of the capacitor unit; the second and third switch units are connected to the alternating-current terminal; The first and the fourth switch unit is respectively connected to the positive terminal and negative terminal of the direct-current bus; the capacitor unit is connected to the direct-current bus between the positive and negative terminals. The two modules are disposed side by side and facing each other.

12 Claims, 11 Drawing Sheets

(56) References Cited

U.S. PATENT DOCUMENTS

| | | | |
|---|---|---|---|
| 7,746,041 B2* | 6/2010 | Xu et al. | 323/223 |
| 7,869,193 B2* | 1/2011 | Nohara et al. | 361/624 |
| 8,422,244 B2* | 4/2013 | Azuma et al. | 361/760 |
| 8,559,193 B2* | 10/2013 | Mazumder | 363/8 |
| 2003/0026118 A1* | 2/2003 | Ikimi et al. | 363/132 |
| 2004/0062006 A1* | 4/2004 | Pfeifer et al. | 361/699 |
| 2005/0105314 A1* | 5/2005 | Nielsen | 363/132 |
| 2007/0247027 A1* | 10/2007 | Kauranen | 310/330 |
| 2008/0112200 A1* | 5/2008 | Tan et al. | 363/101 |
| 2009/0009980 A1* | 1/2009 | Ward et al. | 361/807 |
| 2009/0161301 A1* | 6/2009 | Woody et al. | 361/678 |
| 2010/0039843 A1* | 2/2010 | Takizawa | 363/131 |
| 2012/0119256 A1* | 5/2012 | Okita | 257/140 |
| 2012/0120698 A1* | 5/2012 | Viitanen | 363/126 |
| 2012/0206948 A1* | 8/2012 | Maldini et al. | 363/97 |
| 2012/0320643 A1* | 12/2012 | Yang | 363/56.01 |
| 2013/0044527 A1* | 2/2013 | Vracar et al. | 363/131 |
| 2013/0169035 A1* | 7/2013 | Nakashima | 307/9.1 |
| 2014/0003095 A1* | 1/2014 | Thomas et al. | 363/21.04 |
| 2014/0003103 A1* | 1/2014 | Aaltio | 363/56.03 |

\* cited by examiner

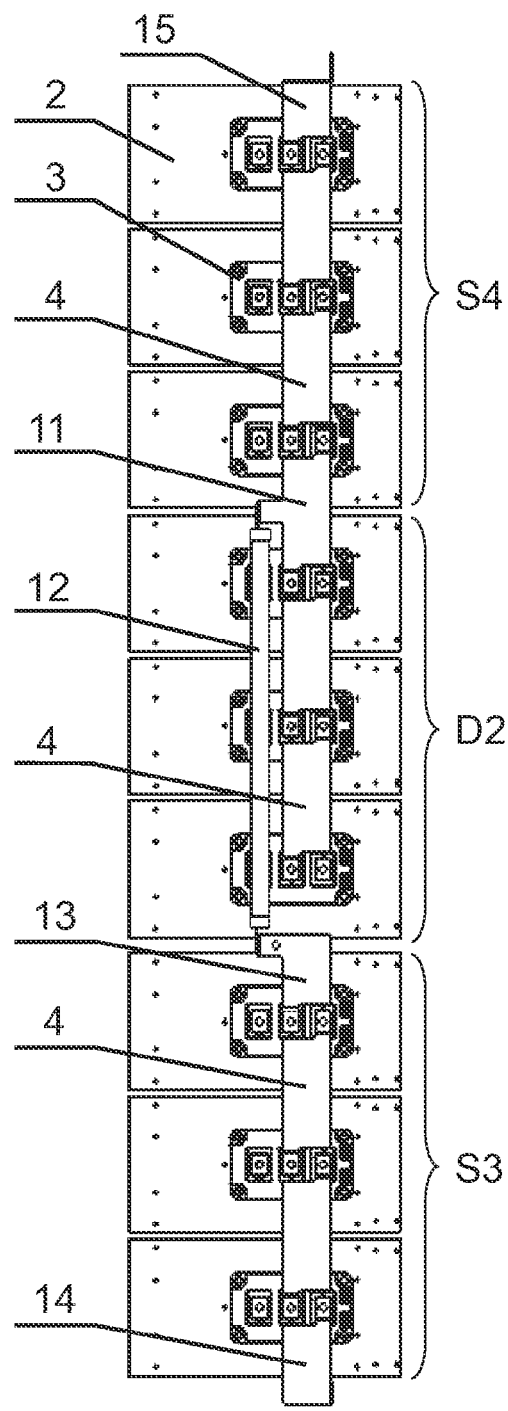
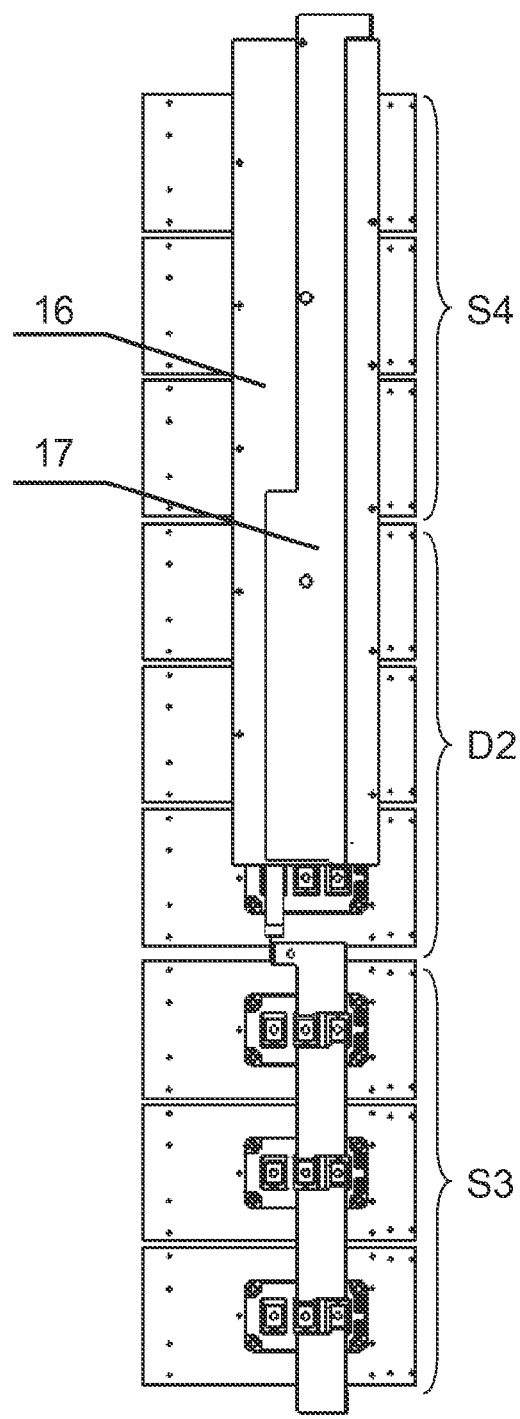
Figure 8
Figure 9

THREE-LEVEL CONVERTER HAVING PHASE BRIDGE ARM

RELATED APPLICATIONS

This application claims priority to Chinese Application Serial Number 201310074909.7, filed on Mar. 8, 2013, the entirety of which is herein incorporated by reference.

BACKGROUND

1. Technical Field

The present disclosure relates to a converter, and more particularly, a three-level converter.

2. Description of Related Art

Frequency converter has wide applications in industrial control, and is particularly important in the control and speed regulation of high-power electrical machines. Therefore, the converter is an important part of the energy system. In the industrial applications, the high power or medium power high voltage electrical machines play more and more important roles, which consume about two-thirds of the gross power generation. Accordingly, it is significant to improve the efficiency of these machines.

The existing ROBICON solution (U.S. Pat. No. 5,625,545) employs a frequency converter in which the high-voltage frequency conversion is achieved by a low voltage semiconductor component. However, the frequency converter according to the ROBICON solution requires a phase-shifting transformer disposed in the front, and hence, the transformer is costly and bulky and associated with more energy loss. Further, the ROBICON solution requires a large number of capacitors, resulting in higher cost and failure rate. In view of the foregoing, the solution is massive in volume, low in efficiency and inferior in reliability. Other high voltage frequency converter products use a high-voltage semiconductor component to achieve the high voltage frequency conversion, yet the high-voltage semiconductor is very expensive and associated with higher energy loss, and hence the cost of the system is high.

To overcome the above-mentioned disadvantages, the direct series connection of low-voltage semiconductor switches, such as the insulated-gate bipolar transistor (IGBT), may be a good approach (in which the semiconductor switches are turn-on or turn-off simultaneously, and equivalently operate for a switch component). Meanwhile, to reduce the cost of the system, it is also desirable to replace the phase-shifting transformer with three-level converter using series connection low-voltage IGBTs. Currently, there are products with the 2-level convertor in which a plurality of IGBTs in series connection are applied. However, the design layout of such products is defective due to the inferior maintainability, large commutation loop and high manufacturing cost.

In view of the foregoing, there exist problems and disadvantages in the current technology and further improvements are required for those ordinarily skilled in the art to solve the above-mentioned problems.

SUMMARY

The following presents a simplified summary of the disclosure in order to provide a basic understanding to the reader. This summary is not an extensive overview of the disclosure and it does not identify key/critical components of the present disclosure or delineate the scope of the present disclosure. Its sole purpose is to present some concepts disclosed herein in a simplified form as a prelude to the more detailed description that is presented later.

In view of the foregoing, one purpose of the present disclosure is to provide a layout design of a three-level converter. The layout uses a modulized design. The product is compact in structure and easy for installation and maintenance. Also, the commutation loop of the converter is small, and the stray inductance is also small. Further, the manufacturing cost of such products is low. Accordingly, the solution provided herein effectively addresses the problems in the prior art.

According to one embodiment of the present disclosure, a three-level converter is disclosed, which includes at least one phase bridge arm, in which each phase bridge arm comprises an upper-half bridge arm circuit module and a lower-half bridge arm circuit module. The upper-half bridge arm circuit module comprises a first switch unit, a second switch unit, a first diode unit, a first connecting busbar, a first insulated wire and a first switching busbar. The first switch unit is in series connected to the second switch unit, the first switch unit is connected to the positive terminal of the direct-current bus, the first connecting busbar connects the first switch unit and the first diode unit, the first switching busbar is connected to the second switch unit, and the first insulated wire is connected to the first switching busbar and the first connecting busbar. The lower-half bridge arm circuit module comprises a third switch unit, a fourth switch unit, a second diode unit, a second connecting busbar, a second insulated wire and a second switching busbar. The third switch unit is in series connected to the fourth switch unit, the first diode unit and the second diode unit are connected to the neutral point of the capacitor unit, the second switch unit and the third switch unit are connected to the alternating-current terminal, the fourth switch unit is connected to the negative terminal of the direct-current bus, the capacitor unit is connected to the direct-current bus at a position between the positive terminal and the negative terminal, the second connecting busbar connects the fourth switch unit and second diode unit, the second switching busbar is connected to the third switch unit, and the second insulated wire connects the second connecting busbar and the second switching busbar. The upper-half bridge arm circuit module and the lower-half bridge arm circuit module are disposed side by side and facing each other.

Each switch unit comprises a plurality of IGBT (insulated-gate bipolar transistor) modules and a plurality of series-connection busbars, in which the IGBT modules are in series connected via the series-connection busbars.

The first switch unit and the fourth switch unit, the first diode unit and the second diode unit, and the second switch unit and the third switch unit are arranged face to face.

The first diode unit is disposed between the first switch unit and the second switch unit, and the second diode unit is disposed between the third switch unit and the fourth switch unit.

Both of the upper-half bridge arm circuit module and the lower-half bridge arm are disposed in a delta shape, in which the first diode unit is disposed by the sides of the first switch unit and the second switch unit, and the second diode unit is disposed by the sides of the third switch unit and fourth switch unit.

The upper-half bridge arm circuit module further comprises a direct-current bus positive-electrode conductor which connects the first switch unit to the positive terminal of the direct-current bus.

The upper-half bridge arm circuit module further comprises a first alternating-current output busbar which connects the second switch unit to the alternating-current terminal.

The upper-half bridge arm circuit module further comprises a first neutral point connecting busbar which connects the first diode unit and the neutral point of the capacitor unit.

The upper-half bridge arm circuit module further comprises an insulating board, and the lower-half bridge arm circuit module further comprises another insulating board.

The lower-half bridge arm circuit module further comprises a direct-current bus negative-electrode conductor which connects the fourth switch unit to the negative terminal of the direct-current bus.

The lower-half bridge arm circuit module further comprises a second alternating-current output busbar which connects the third switch unit to the alternating-current terminal.

The lower-half bridge arm circuit module further comprises a second neutral point connecting busbar which connects the second diode unit to the neutral point of the capacitor unit.

In view of the foregoing, the technical solutions of the present disclosure result in significant advantageous and beneficial effects, compared with existing techniques. The implementation of the above-mentioned technical solutions achieves substantial technical improvements and provides utility that is widely applicable in the industry. Specifically, technical advantages generally attained, by embodiments of the present disclosure, include:

1. The proposed modulized design uses half of the bridge arm as a module; thereby facilitating the installation and replacement procedures and resulting in a compact structure with a smaller commutation loop and reduced stray inductance;

2. The connecting elements are composed of a combination of connecting busbars (i.e., those made of conductive materials; such as copper busbar or aluminum) and insulated wires (i.e., insulated cables), as compared with other products in which all the connecting elements are busbars; in this way, the present disclosure effectively avoid the problem of local discharge (or partial discharge) resulted from the high-voltage during the connecting process of the system; and 3. The upper-half bridge arm circuit and the lower-half bridge arm circuit are disposed side by side and facing each other; this feature, in combination with the features (1) and (2) identified above, results in a converter with a smaller commutation loop, a reduced stray inductance and a compact structure; also, the converter is easy to install and the manufacturing cost of such converter is low.

Many of the attendant features will be more readily appreciated, as the same becomes better understood by reference to the following detailed description considered in connection with the accompanying drawings.

BRIEF DESCRIPTION OF THE DRAWINGS

The present description will be better understood from the following detailed description read in light of the accompanying drawing, wherein:

FIG. 8 and FIG. 9 respectively illustrate the circuit structure layout and connecting wires of a lower-half bridge arm according to the first embodiment of the present disclosure;

DETAILED DESCRIPTION

Figure 1:
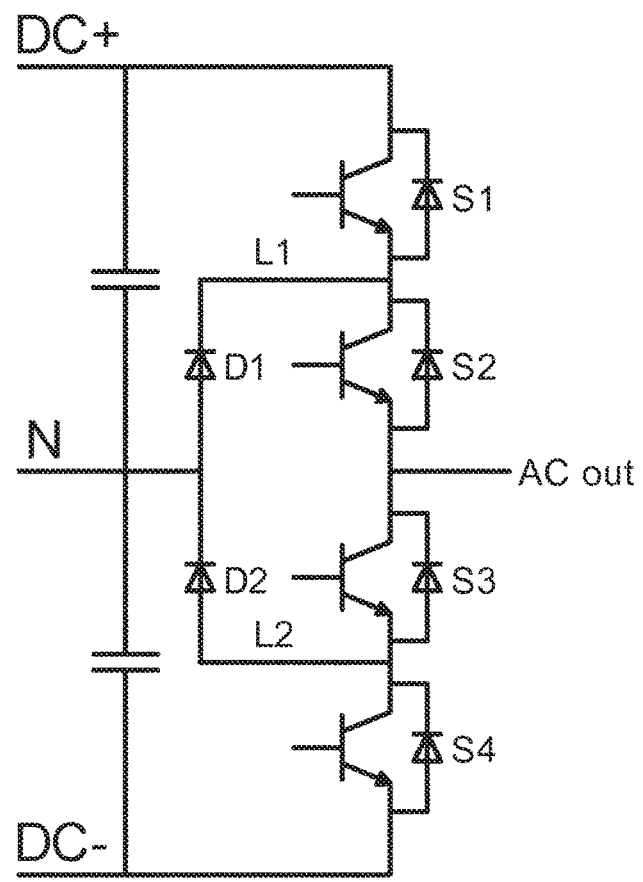
FIG. 1 is a schematic diagram illustrating the circuit of a three-level converter (single phase)

In the following detailed description, for purposes of explanation, numerous specific details are set forth in order to attain a thorough understanding of the disclosed embodiments. In accordance with common practice, the various described features/elements are not drawn to scale but instead are drawn to best illustrate specific features/elements relevant to the present disclosure. Also, like reference numerals and designations in the various drawings are used to indicate like elements/parts. Moreover, well-known structures and devices are schematically shown in order to simplify the drawing and to avoid unnecessary limitation.

The technical solution of the present disclosure is directed to a three-level converter which could be used in frequency converters or widely applied in other related technical contexts. The component layout and connection framework of the three-level converter are discussed herein below in connection with FIG. 1 to FIG. 13.

Figure 2:
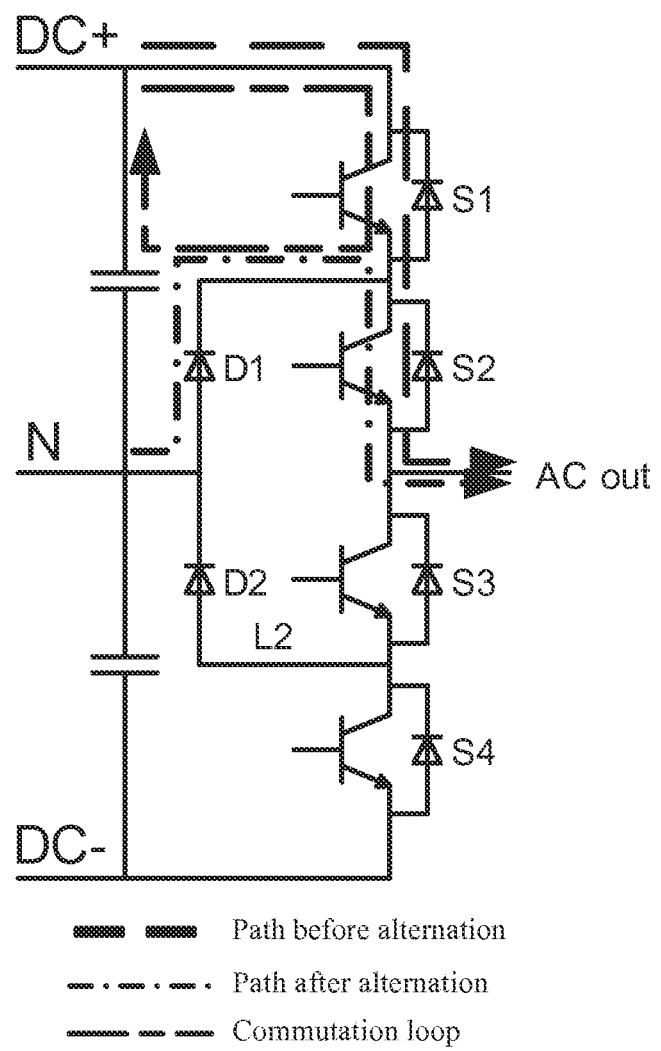
FIG. 2 illustrates one commutation loop of the three-level converter of FIG. 1.
Figure 3:
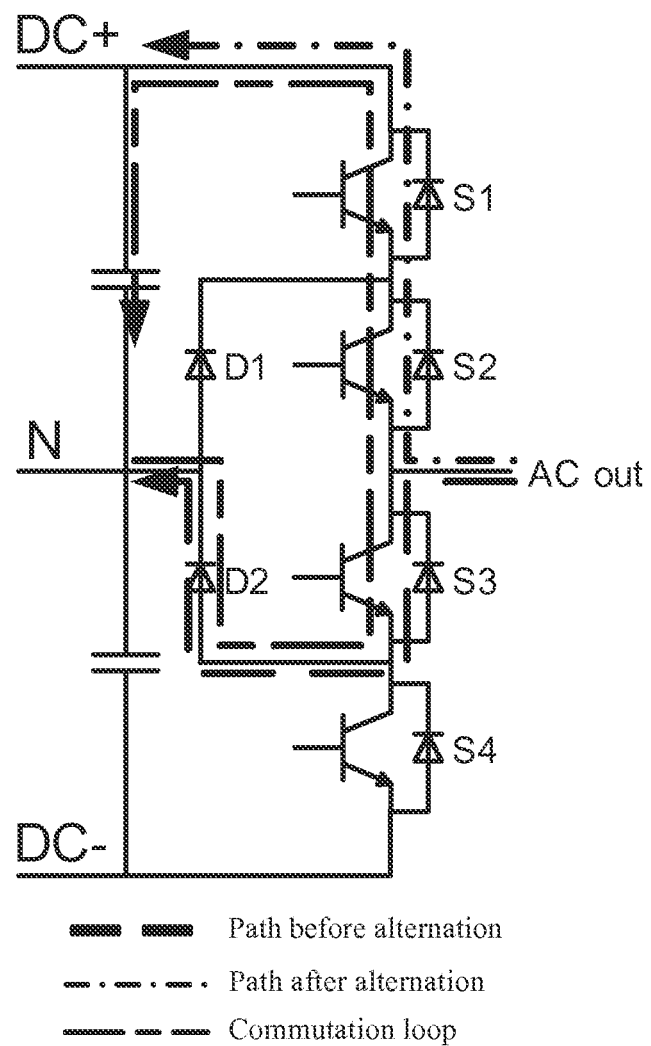
FIG. 3 illustrates another commutation loop of the three-level converter of FIG. 1.

FIG. 1 is a schematic diagram illustrating the circuit of a three-level converter (single phase). As illustrated in FIG. 1, the three-level converter includes a first switch unit (S1), a second switch unit (S2), a third switch unit (S3), a fourth switch unit (S4), a first diode unit (D1) and a second diode unit (D2). In structure, the first switch unit (S1) is in series connected to second switch unit (S2), the first diode unit (D1) electrically connect the first switch unit (S1) and the second switch unit (S2); the third switch unit (S3) is in series connected to the fourth switch unit (S4), the second diode unit (D2) electrically connects the third switch unit (S3) and the fourth switch unit (S4), the first diode unit (D1) and the second diode unit (D2) are connected to the neutral point N of the capacitor unit, the second switch unit (S2) and the third switch unit (S3) are connected to the alternating-current terminal (AC out), the first switch unit (S1) is connected to the positive terminal (DC+) of the direct-current bus, the fourth switch unit (S4) is connected to the negative terminal (DC−) of the direct-current bus, the capacitor unit is connected to a position between the positive terminal (DC+) of the direct-current bus and the negative terminal (DC−) of the direct-current bus. FIG. 2 and FIG. 3 schematically depict two commutation loops of the three-level converter in operation. As could be appreciated, the commutation loops of the three-level converter are well-known to persons having ordinary skill in the art, and they are not sought to be protected in the present disclosure; accordingly, detailed description thereof is omitted herein. It should be noted that the first switch unit (S1) to the fourth switch unit (S4) could be an insulated-gate bipolar transistor (IGBT).

Figure 4:
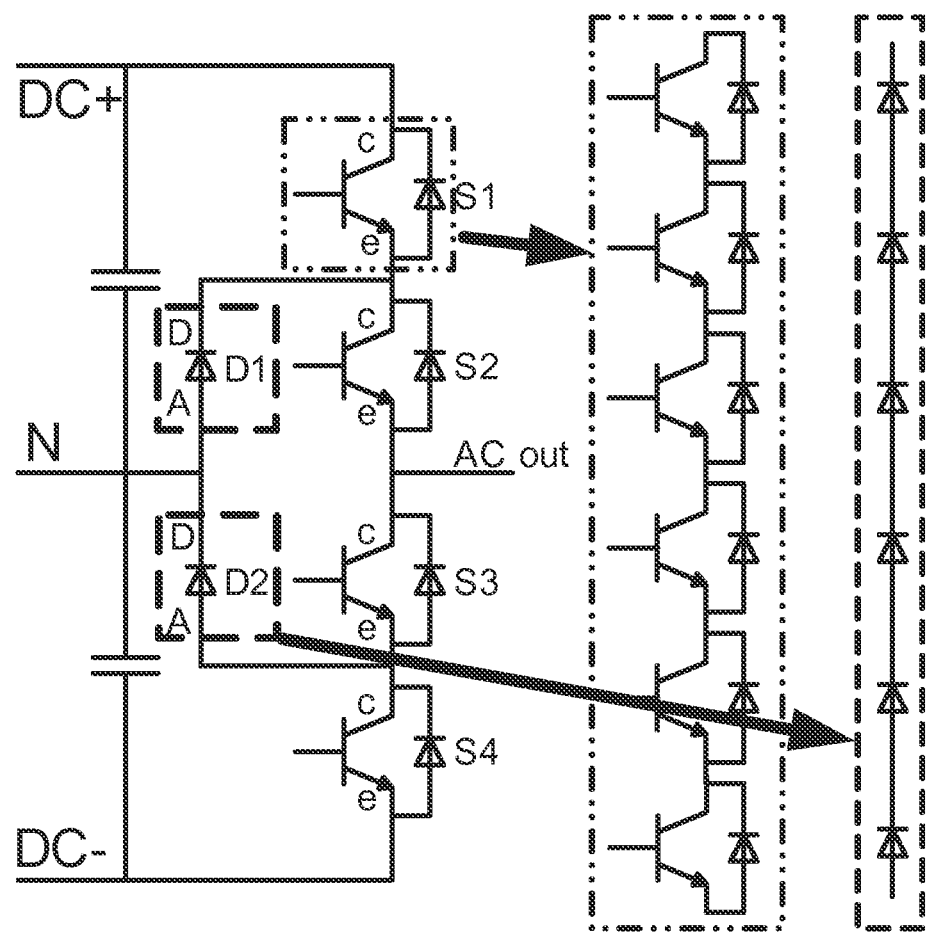
FIG. 4 is a schematic diagram illustrating an IGBT series circuit according to one embodiment of the present disclosure.
Figure 5:
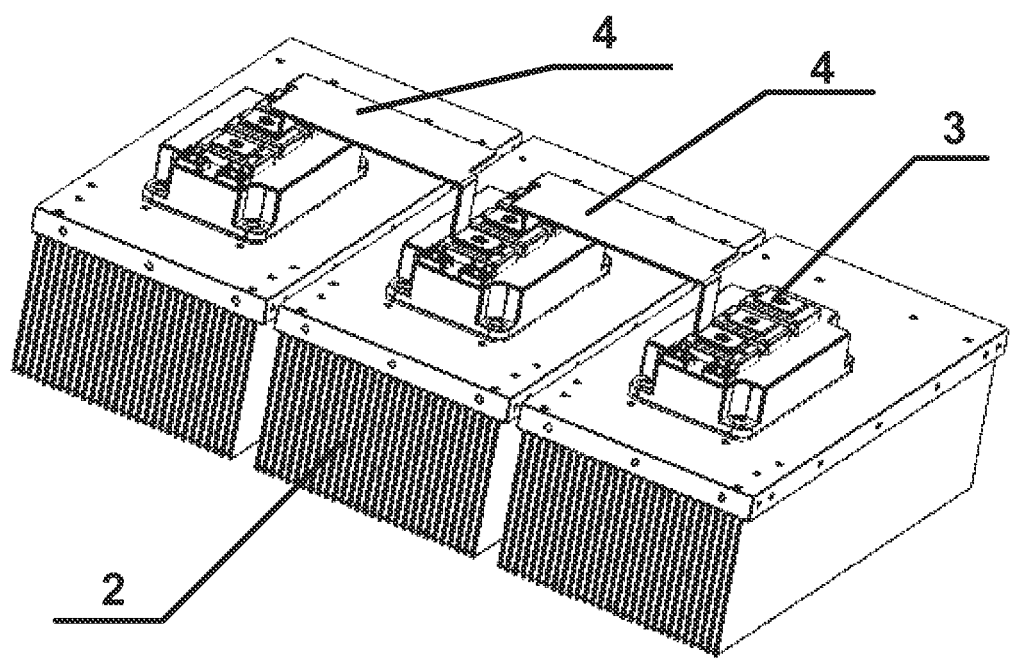
FIG. 5 is a structural diagram illustrating a switch unit according to one embodiment of the present disclosure.

FIG. 4 is a schematic diagram illustrating an IGBT series circuit according to one embodiment of the present disclosure. In the present embodiment, each equivalent switch unit consists of a plurality of insulated-gate bipolar transistors that are in series connected. For example, there are six IGBTs depicted in FIG. 4. Further, each diode unit comprises a plurality of diodes that are in series connected. For example, there are six diodes depicted in FIG. 4. The structure of the equivalent switch unit according to the present embodiment is illustrated in FIG. 5, in which each switch unit comprises a plurality of (e.g., three, as seen in FIG. 5) insulated-gate bipolar transistor modules 3 and a plurality of series-connection busbars 4, each diode unit comprises a plurality of diodes or insulated-gate bipolar transistors, and the plurality of diodes or insulated-gate bipolar transistors are in series connected via the series-connection busbars. According to the present embodiment, each insulated-gate bipolar transistor module 3 has two insulated-gate bipolar transistors integrated therein, and the insulated-gate bipolar transistor modules 3 are in series connected via the series-connection busbars 4. It should be noted that the busbars are manufactured from conductive materials such as copper and aluminum. For the sake of illustration, the description hereinbelow uses the busbar as an example. Further, the insulated-gate bipolar transistor module 3 is disposed on the heat dissipator 2.

As could be appreciated, although the above discussion is directed to six series-connected components, the present disclosure is not limited thereto. In practice, persons having ordinary skill in the art would adjust the number of the component as desired.

Figure 6:
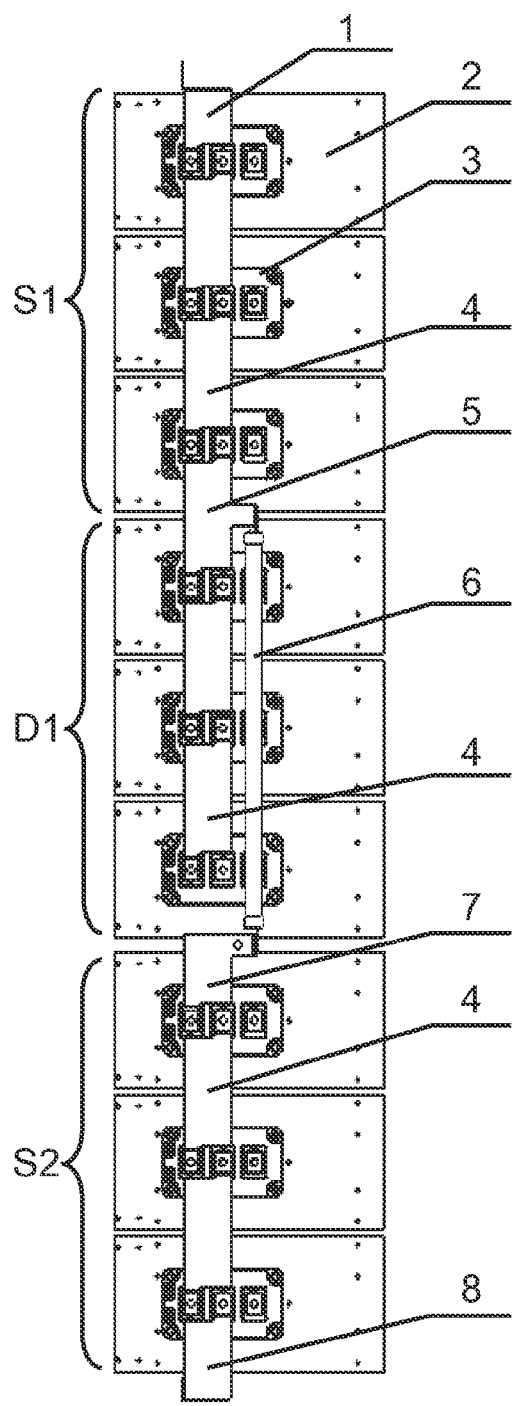
FIG. 6 and FIG. 7 respectively illustrate the circuit structure layout and connecting wires of an upper-half bridge arm according to a first embodiment of the present disclosure.
Figure 7:
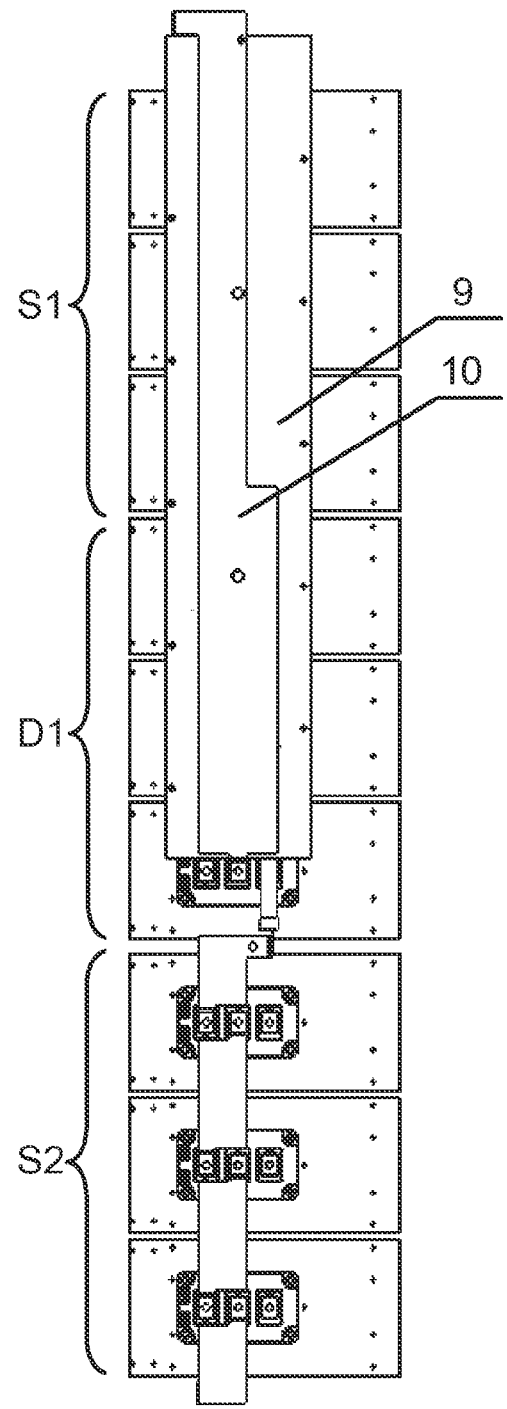
Figure 10:
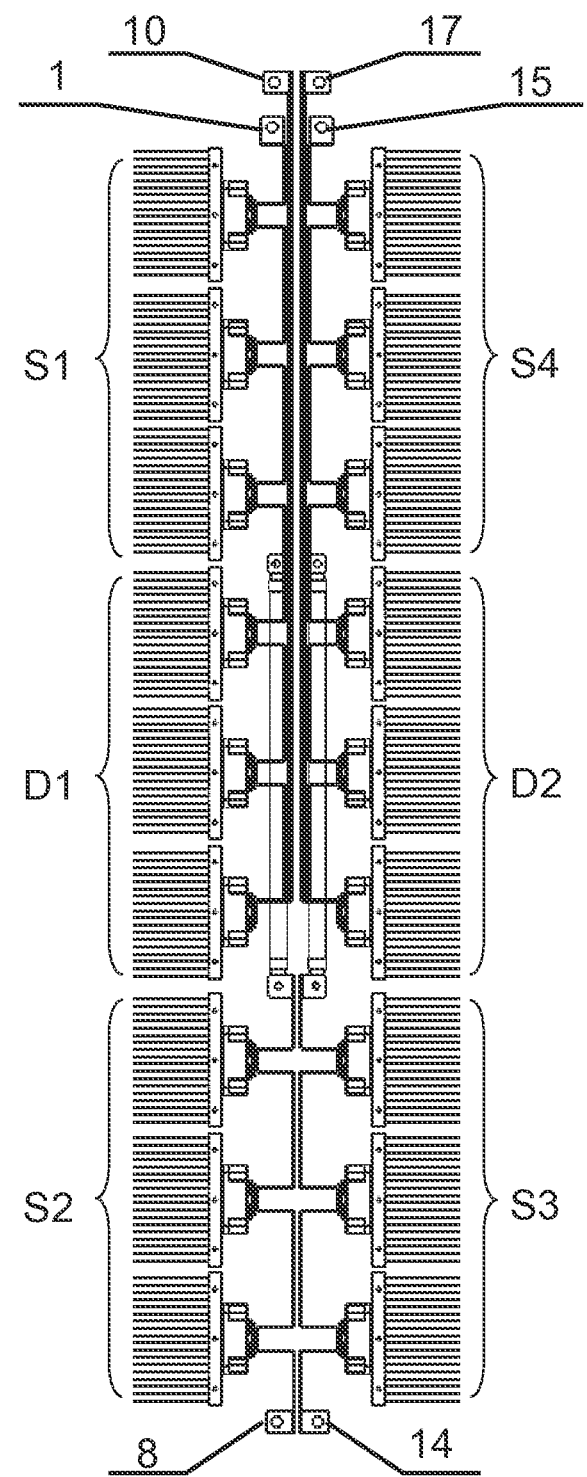
FIG. 10 is a structural diagram illustrating a three-level converter single-phase bridge arm according to the first embodiment of the present disclosure.

In the first embodiment, the structural design of the overall bridge arm is illustrated in FIG. 10, in which the structure of the upper-half bridge arm is depicted in FIG. 6 and FIG. 7, and the upper-half bridge arm circuit module comprises a first switch unit (S1), a second switch unit (S2) and a first diode unit (D1). The structure of the lower-half bridge arm is depicted in FIG. 8 and FIG. 9, and the lower-half bridge arm circuit module comprises a third switch unit (S3), a fourth switch unit (S4) and a second diode unit (D2).

In structural design, the switch unit (S1) is disposed at the upper portion of the upper-half bridge arm, the diode unit (D1) is disposed at the middle portion of the upper-half bridge arm, whereas the switch unit (S2) is disposed at the lower portion of the upper-half bridge arm; the switch unit (S3) is disposed correspondingly to the position of S2 and is located at the lower portion of the lower-half bridge arm, the diode unit (D2) is disposed correspondingly to the position of D1 and is located at the middle portion of the lower-half bridge arm, whereas the switch unit (S4) is disposed correspondingly to the position of S1 and is located at the upper portion of the lower-half bridge arm. The upper-half bridge arm circuit module and the lower-half bridge arm circuit module are disposed side by side and facing each other in a substantially mirror relationship, and the thus-obtained overall structure is U-shape.

More specifically, the whole bridge arm, as illustrated in FIG. 10, has the first switch unit (S1) facing the fourth switch unit (S4), the first diode unit (D1) facing the second diode unit (D2), and the second switch unit (S2) facing the third switch unit (S3). The upper-half bridge arm circuit module, as illustrated in FIG. 6 and FIG. 7, has the first diode unit (D1) disposed between the first switch unit (S1) and the second switch unit (S2), and the first switch unit (S1), the first diode unit (D1) and the second switch unit (S2) are arranged in a straight line; similarly, the lower-half bridge arm circuit module, as depicted in FIG. 8 and FIG. 9, has the second diode unit (D2) disposed between the third switch unit (S3) and the fourth switch unit (S4), and the fourth switch unit (S4), the second diode unit (D2) and the third switch unit (S3) are arranged in a straight line.

Figure 11:
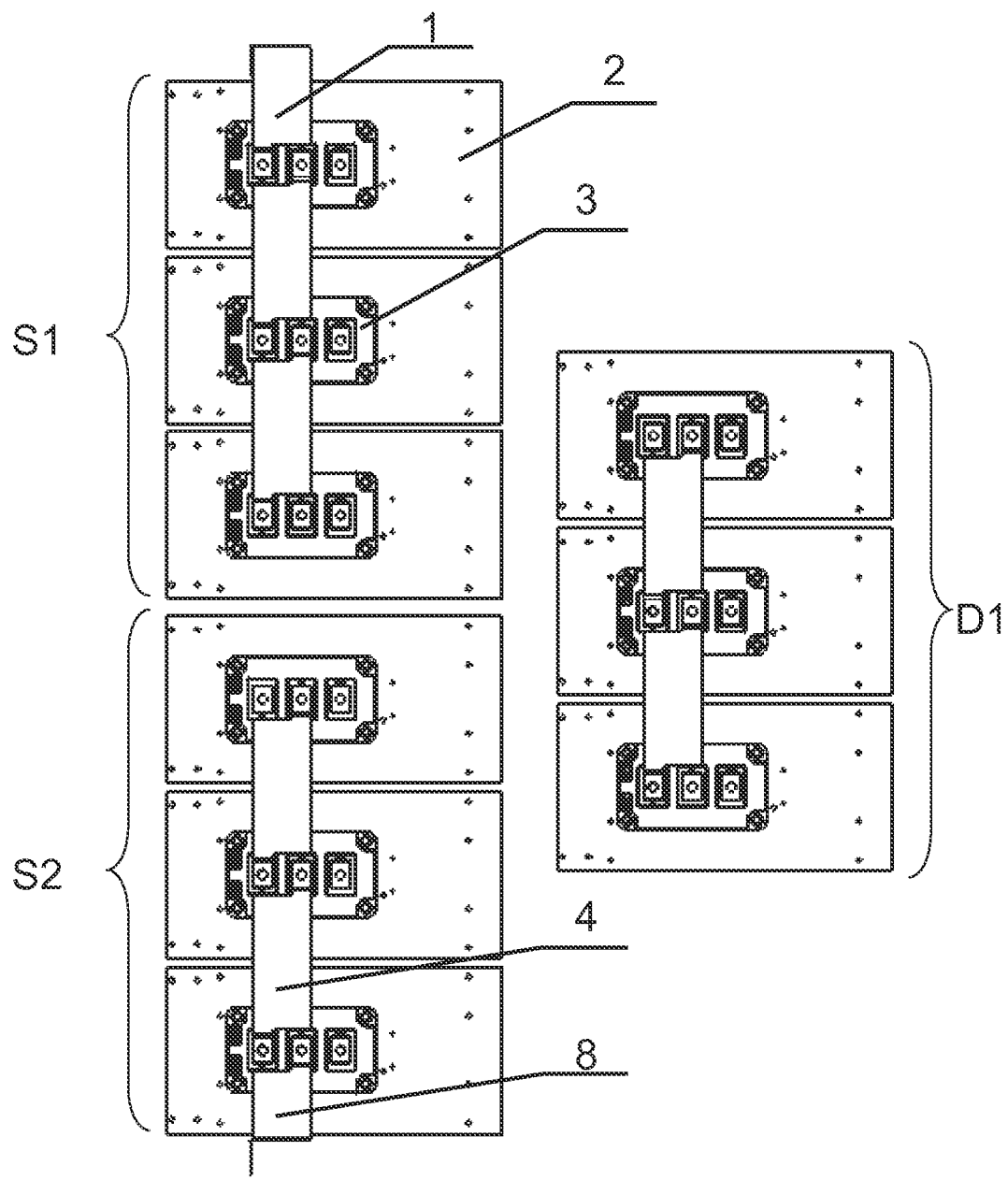
FIG. 11 illustrates the circuit structure layout of an upper-half bridge arm according to a second embodiment of the present disclosure.
Figure 12:
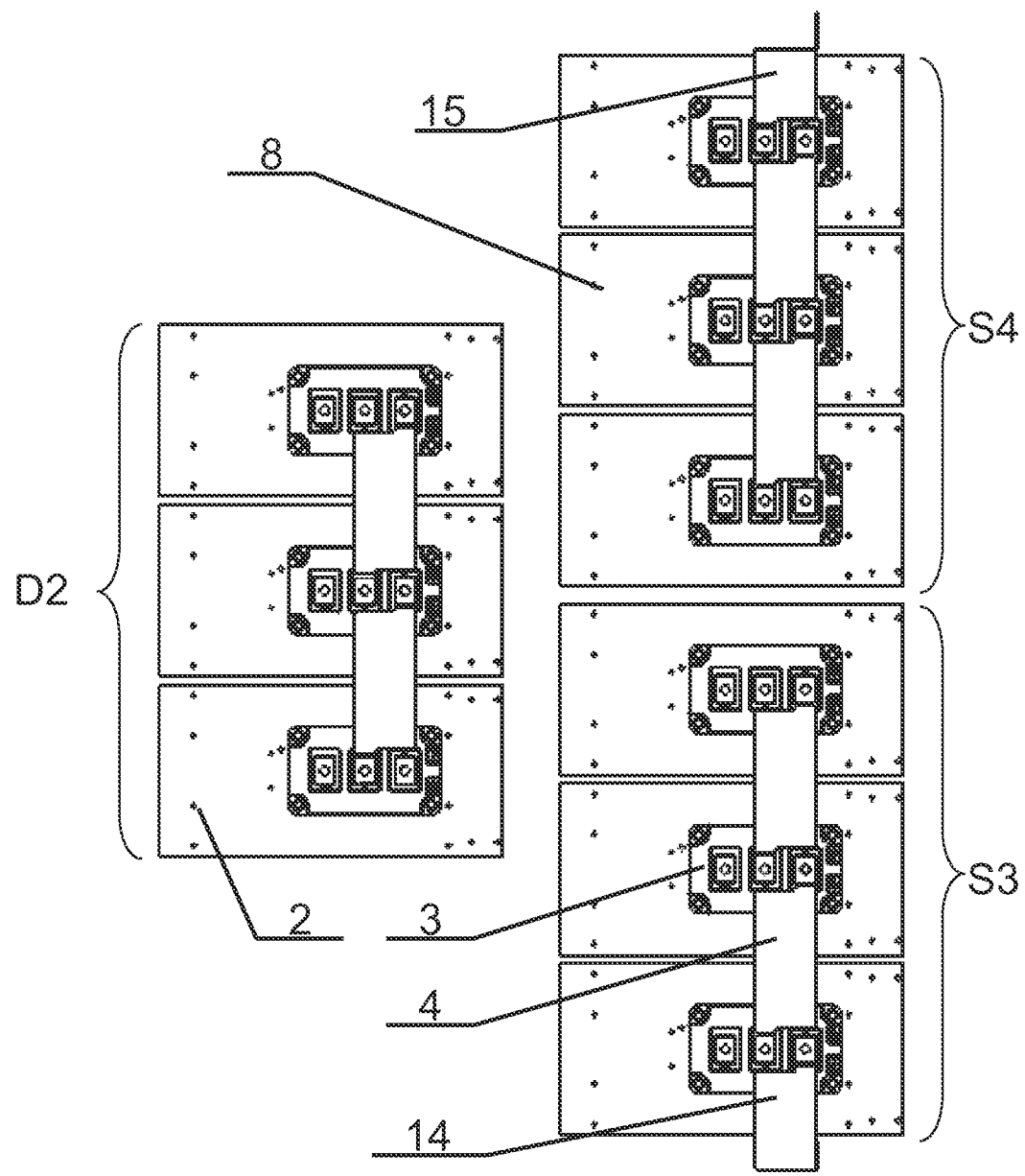
FIG. 12 illustrates the circuit structure layout of a lower-half bridge arm according to a second embodiment of the present disclosure.
Figure 13:
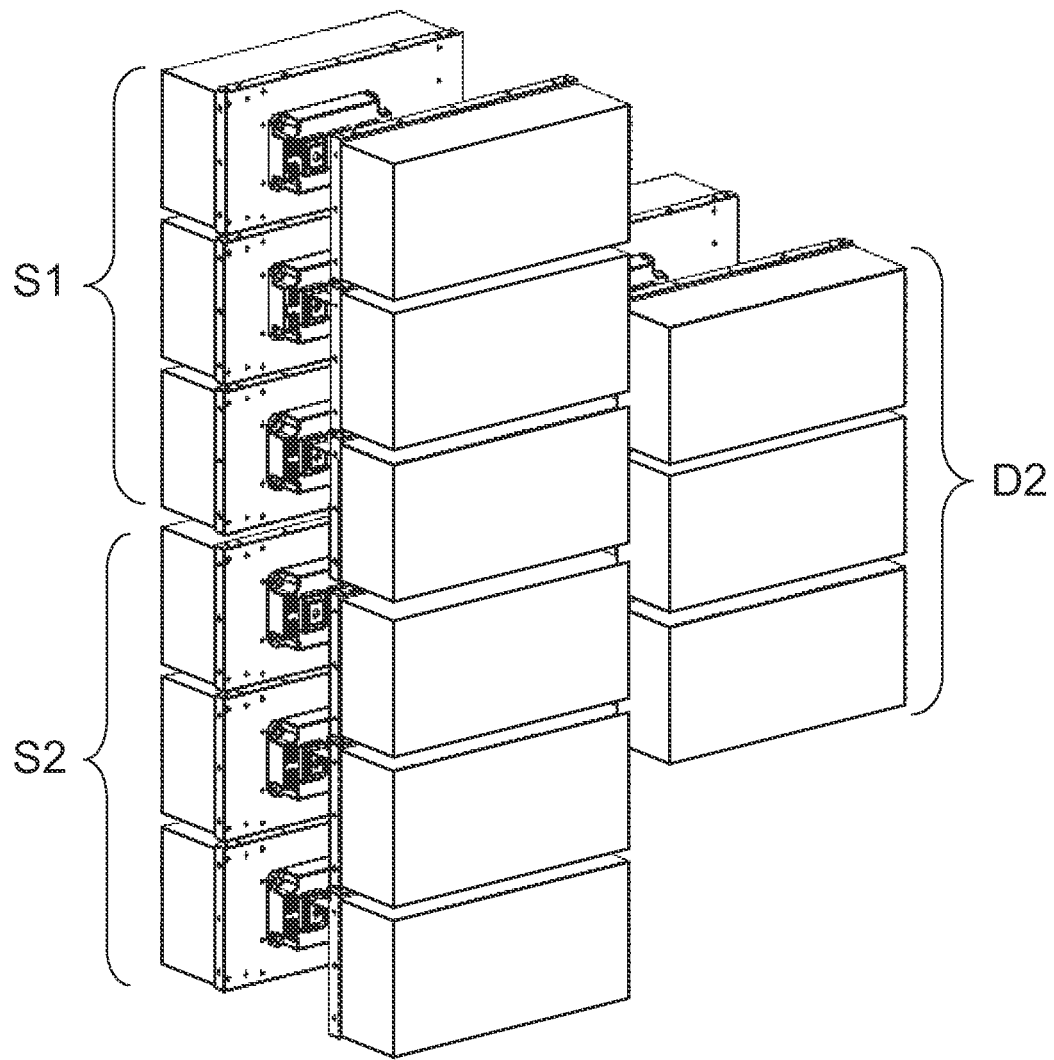
FIG. 13 is a structural diagram illustrating a three-level converter single-phase bridge arm according to the second embodiment of the present disclosure.

The second embodiment of the present disclosure is illustrated in FIGS. 11, 12 and 13. FIG. 11 illustrates the circuit structure layout of an upper-half bridge arm of a three-level single-phase bridge arm. As illustrated in FIG. 11, the first switch unit (S1) and the second switch unit (S2) are vertically disposed with the first switch unit (S1) being at the top while the second switch unit (S2) being at the bottom, and the first diode unit (D1) is disposed by the side of the first switch unit (S1) and the second switch unit (S2), thereby giving an overall arrangement in a delta (Δ) shape. FIG. 12 illustrates the circuit structure layout of a lower-half bridge arm of a three-level single-phase bridge arm. As illustrated in FIG. 12, the overall structure is also arranged in a delta (Δ) shape, in which the third switch unit (S3) is disposed at the bottom, the fourth switch unit (S4) is disposed at the top, and the second diode unit (D2) is disposed by the side of the third switch unit and fourth switch unit. Regarding the overall bridge arm illustrated in FIG. 13, the upper-half and lower-half bridge arms face each other in a substantially mirror relationship, and the thus-obtained overall structure is U-shape.

In view of the foregoing, the present disclosure provides a novel component layout of three-level converter based on series connected IGBTs. The characteristics of the present layout include: providing a modulization design using half bridge arm as a module, and the upper-half bridge arm circuit and the lower-half bridge arm circuit being disposed side by side and facing each other, thereby facilitating the installation and replacement thereof, and resulting in a compact structure, reducing the commutation loop area of the converter and decreasing the stray inductance.

Another feature of the structure provided by the present disclosure is the way in which the components are connected. With respect to the connection arrangement of the upper-half bridge arm, in the three-level converter based on series connected IGBTs, as illustrated in FIGS. 6 and 7, the internal components of the first and second switch units (S1 and S2) are connected by series-connection busbars 4 (for example, copper series-connection busbars), the first diode unit (D1) consists of a plurality of diodes that are in series connected (it should be noted that the a plurality of diodes may be connected via series-connection busbars 4), the first switch unit (S1) and the first diode unit (D1) are connected via the first connecting busbar 5 (such as copper connection busbar), the connection among the first switch unit (S1), the first diode unit (D1) and the second switch unit (S2) is composed of the first insulated wire 6 (e.g., an insulated wire resistant to partial discharge), the first connecting busbar 5 and the first switching busbar 7 (e.g., copper switching busbar), the output wire of the upper-half bridge arm is the first alternating-current output busbar 8 (such as copper alternating-current output busbar), the first diode unit (D1) of the upper-half bridge arm and the neutral point (N) of the capacitor unit are connected via the first neutral point connecting busbar 10 (e.g., copper neutral point connecting busbar), the insulation between the first neutral point connecting busbar 10 and other conductors within the first switch unit (S1) and the first diode unit (D1) of the upper-half bridge arm is achieved by the insulating board 9, and it should be noted that the other conductors within the first switch unit (S1) and the first diode unit (D1) are the series-connection busbar 4, the first connecting busbar 5 and the first switching busbar 7. The connection arrangement of the lower-half bridge arm is shown in FIGS. 8 and 9. As illustrated, the internal components of the third switch unit (S3), the second diode unit (D2) and the fourth switch unit (S4) are connected by series-connection busbars 4 (for example, copper series-connection busbars), the fourth switch unit (S4) and the second diode unit (D2) are connected via the second connecting busbar 11 (such as copper connecting busbar), the connection among the fourth switch unit (S4), the second diode unit (D2) and the third switch unit (S3) is composed of the second insulated wire 12 (e.g., an insulated wire resistant to partial discharge), the second connecting busbar 11 and the second switching busbar 13 (e.g., copper switching busbar). The output wire of the lower-half bridge arm is the second alternating-current output busbar 14 (such as copper alternating-current output busbar), the second diode unit (D2) of the lower-half bridge arm and the neutral point (N) of the capacitor unit are connected via the second neutral point connecting busbar 17 (e.g., copper neutral point connecting busbar), the insulation between the second neutral point connecting busbar 17 and other conductors within the fourth switch unit (S4) and the second diode unit (D2) of the lower-half bridge arm is achieved by the insulating board 16, and it should be noted that the other within the fourth switch unit (S4) and the second diode unit (D2) are the series-connection busbar 4, the second connecting busbar 11 and the second switching busbar 13.

Specifically, the whole bridge arm is illustrated in FIG. 10, in which the upper-half bridge arm circuit module comprises the direct-current bus positive-electrode conductor 1, in which the direct-current bus positive-electrode conductor 1 connects the first switch unit (S1) and the positive terminal (DC+) of the direct-current bus; the lower-half bridge arm circuit module comprises the direct-current bus negative-electrode conductor 15, in which the direct-current bus negative-electrode conductor 15 connects the fourth switch unit (S4) and the negative terminal (DC−) of the direct-current bus.

As illustrated in FIG. 6 and FIG. 7, the upper-half bridge arm circuit module further comprises the first connecting busbar 5, in which the first connecting busbar 5 connects the first switch unit (S1) and the first diode unit (D1); the upper-half bridge arm circuit module further comprises the first partial discharge-resistant insulated wire 6 and the first switching busbar 7, in which the first partial discharge-resistant insulated wire 6 is connected to the first switch unit (S1), the second switch unit (S2) and the first diode unit (D1), the first switching busbar 7 connects the second switch unit (S2) and the first insulated wire 6; the upper-half bridge arm circuit module further comprises the first alternating-current output busbar 8 which connects the second switch unit (S2) and the alternating-current terminal (AC out); the upper-half bridge arm circuit module further comprises the first neutral point connecting busbar 10, in which the first neutral point connecting busbar 10 connects the first diode unit (D1) and the neutral point (N) of the capacitor unit; the upper-half bridge arm circuit module further comprises the insulating board 9, in which the insulating board 9 insulates the first neutral point connecting busbar 10 from other conductors within the first switch unit (S1) and the first diode unit (D1) of the upper-half bridge arm circuit.

As illustrated in FIG. 8 and FIG. 9, the lower-half bridge arm circuit module further comprises the second connecting busbar 11, in which the second connecting busbar 11 connects the fourth switch unit (S4) and the second diode unit (D2); the lower-half bridge arm circuit module further comprises the second insulated wire 12 (such as, the partial discharge-resistant insulated wire) and the second switching busbar 13, the second insulated wire 12 is connected to the third switch unit (S3), the fourth switch unit (S4) and the second diode unit (D2), the second switching busbar 13 connects the third switch unit (S3) and the second insulated wire 12; the lower-half bridge arm circuit module further comprises the second alternating-current output busbar 14, in which the second alternating-current output busbar 14 connects the third switch unit (S3) to the alternating-current terminal (AC out); the lower-half bridge arm circuit module further comprises the second neutral point connecting busbar 17, in which the second neutral point connecting busbar 17 connects the second diode unit D2 and the neutral point of the capacitor unit; moreover, the lower-half bridge arm circuit module further comprises the insulating board 16, in which the insulating board 16 insulate the second neutral point connecting busbar 17 from other conductors within the fourth switch unit (S4) and the second diode unit (D2) of the upper-half bridge arm circuit.

Further, since the connection framework of the second embodiment according to the present disclosure is substantially similar to the connection framework of the first embodiment, detailed description thereof is omitted herein for the sake of brevity.

In view of the foregoing, the connection framework provided by the present disclosure has the following characteristics: the connecting elements are composed of a combination of connecting busbars (such as the copper busbar) and insulated wires, as compared with other products and patents in which all the connecting elements are busbars; in this way, the present disclosure effectively avoid the problem of partial discharge resulted from the high-voltage during the connecting process of the system; there are only two layers of connecting busbar for connecting the half bridge arms, the structure is simple and the manufacturing cost is reduced.

Although various embodiments of the disclosure have been described above with a certain degree of particularity, or with reference to one or more individual embodiments, they are not limiting to the scope of the present disclosure. Those with ordinary skill in the art could make numerous alterations to the disclosed embodiments without departing from the spirit or scope of this disclosure. Accordingly, the protection scope of the present disclosure shall be defined by the accompany claims.

What is claimed is:

1. A three-level converter comprising at least one phase bridge arm, wherein the phase bridge arm comprises:
    an upper-half bridge arm circuit module, comprising a first switch unit, a second switch unit, a first diode unit, a first connecting busbar, a first insulated wire and a first switching busbar, wherein the first switch unit is in series connected to the second switch unit, the first switch unit is connected to the positive terminal of a direct-current bus, the first connecting busbar connects the first switch unit and the first diode unit, the first switching busbar is connected to the second switch unit, and the first insulated wire connects the first switching busbar and the first connecting busbar; and
    a lower-half bridge arm circuit module, comprising a third switch unit, a fourth switch unit, a second diode unit, a second connecting busbar, a second insulated wire and a second switching busbar, wherein the third switch unit is in series connected to the fourth switch unit; the first diode unit and the second diode unit are connected to the neutral point of a capacitor unit; the second switch unit and the third switch unit are connected to an alternating-current terminal; the fourth switch unit is connected to the negative terminal of the direct-current bus, the capacitor unit is connected to the direct-current bus at a position between the positive terminal and the negative terminal; the second connecting busbar connects the fourth switch unit and the second diode unit, the second switching busbar is connected to the third switch unit, the second insulated wire connects the second connecting busbar and the second switching busbar, and the upper-half bridge arm circuit module and the lower-half bridge arm circuit module are disposed side by side and arranged face to face.

2. The three-level converter according to claim 1, wherein each of the switch units comprises a plurality of insulated-gate bipolar transistor modules and a plurality of series-connection busbars, and the insulated-gate bipolar transistor modules are in series connected via the series-connection busbars.

3. The three-level converter according to claim 1, wherein the first switch unit faces the fourth switch unit, the first diode unit faces the second diode unit, and the second switch unit faces the third switch unit.

4. The three-level converter according to claim 3, wherein the first diode unit is disposed between the first switch unit and the second switch unit, and the second diode unit is disposed between the third switch unit and the fourth switch unit.

5. The three-level converter according to claim 3, wherein the upper-half bridge arm circuit module and the lower-half bridge are both disposed in a delta shape, wherein the first diode unit is disposed by the sides of the first switch unit and the second switch unit, and the second diode unit is disposed by the sides of the third switch unit and fourth switch unit.

6. The three-level converter according to claim 1, wherein the upper-half bridge arm circuit module further comprises a direct-current bus positive-electrode conductor connecting the first switch unit to the positive terminal of the direct-current bus.

7. The three-level converter according to claim 1, wherein the upper-half bridge arm circuit module further comprises a first alternating-current output busbar connecting the second switch unit to the alternating-current terminal.

8. The three-level converter according to claim 1, wherein the upper-half bridge arm circuit module further comprises a first neutral point connecting busbar connecting the first diode unit and the neutral point of the capacitor unit.

9. The three-level converter according to claim 8, wherein the upper-half bridge arm circuit module further comprises an insulating board, and the lower-half bridge arm circuit module further comprises another insulating board.

10. The three-level converter according to claim 1, wherein the lower-half bridge arm circuit module further comprises a direct-current bus negative-electrode conductor connecting the fourth switch unit to the negative terminal of the direct-current bus.

11. The three-level converter according to claim 1, wherein the lower-half bridge arm circuit module further comprises a second alternating-current output busbar connecting the third switch unit to the alternating-current terminal.

12. The three-level converter according to claim 1, wherein the lower-half bridge arm circuit module further comprises a second neutral point connecting busbar connecting the second diode unit and the neutral point of the capacitor unit.

* * * * *